US011405375B2

(12) United States Patent
VanBlon et al.

(10) Patent No.: US 11,405,375 B2
(45) Date of Patent: Aug. 2, 2022

(54) DEVICE AND METHOD FOR RECEIVING A TEMPORARY CREDIT TOKEN

(71) Applicant: Lenovo (Singapore) Pte. Ltd., New Tech Park (SG)

(72) Inventors: Russell Speight VanBlon, Raleigh, NC (US); Nathan J. Peterson, Oxford, NC (US); John Carl Mese, Cary, NC (US); Mark Patrick Delaney, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 293 days.

(21) Appl. No.: 16/143,669

(22) Filed: Sep. 27, 2018

(65) Prior Publication Data

US 2020/0106762 A1 Apr. 2, 2020

(51) Int. Cl.
*H04L 29/06* (2006.01)
*H04L 9/40* (2022.01)
*H04W 12/06* (2021.01)

(52) U.S. Cl.
CPC ........ *H04L 63/0807* (2013.01); *H04L 63/083* (2013.01); *H04L 63/0853* (2013.01); *H04W 12/06* (2013.01); *H04L 2463/082* (2013.01)

(58) Field of Classification Search
CPC .............. H04L 63/0807; H04L 63/083; H04L 63/0853; H04L 2463/082; H04L 63/0846;

(Continued)

(56) References Cited

U.S. PATENT DOCUMENTS

| 4,893,338 A | * | 1/1990 | Pastor | B07C 1/00 |
| | | | | 380/30 |
| 6,971,005 B1 | * | 11/2005 | Henry | H04L 63/0815 |
| | | | | 713/155 |

(Continued)

FOREIGN PATENT DOCUMENTS

| CN | 104079624 A | * | 10/2014 | ......... H04L 67/2823 |
| CN | 106330918 A | * | 1/2017 | ......... H04L 63/0815 |
| KR | 20150001681 A | * | 1/2015 | ........... H04L 1/1685 |

OTHER PUBLICATIONS

Kiljan, Sven, Koen Simoens, Danny De Cock, Marko Van Eekelen, and Harald Vranken. "A survey of authentication and communications security in online banking." ACM Computing Surveys (CSUR) 49, No. 4 (2016): 1-35. (Year: 2016).*

(Continued)

*Primary Examiner* — Luu T Pham
*Assistant Examiner* — Walter J Malinowski
(74) *Attorney, Agent, or Firm* — The Small Patent Law Group LLC; Dean D. Small

(57) ABSTRACT

A computer implemented method, device and computer program device are provided including one or more processors and an input to collect credential related content including a first network resource identifier related to a first one of multiple network resources, the credential related content further including a master password that is associated with the first network resource identifier and that is associated with network resource identifiers for a remainder of the multiple network resources. Responsive to execution of the program instructions, the processor converts the master password and the first network resource identifier into a first hash code to receive a temporary credential token from the authentication service in connection with the first hash code.

18 Claims, 5 Drawing Sheets

(58) Field of Classification Search
CPC ........... H04L 2209/56; H04L 2209/805; H04L 9/0863; H04L 9/3213; H04L 9/3239; H04W 12/06
USPC .......................................................... 726/5
See application file for complete search history.

(56) References Cited

U.S. PATENT DOCUMENTS

| | | | | |
|---|---|---|---|---|
| 7,225,462 | B2* | 5/2007 | Bass | H04L 63/0815 726/4 |
| 7,599,493 | B2* | 10/2009 | Sandhu | H04L 9/085 713/168 |
| 7,788,709 | B1* | 8/2010 | Henry | H04L 63/083 726/6 |
| 8,793,774 | B1* | 7/2014 | Kumar | H04L 63/20 726/6 |
| 9,106,642 | B1* | 8/2015 | Bhimanaik | H04L 63/0807 |
| 9,774,590 | B1* | 9/2017 | Bronshtein | H04L 63/06 |
| 10,075,334 | B1* | 9/2018 | Kozura | H04L 12/2807 |
| 10,505,925 | B1* | 12/2019 | Doloff | H04L 63/083 |
| 2002/0046046 | A1* | 4/2002 | Barrott | G06Q 30/0601 705/26.1 |
| 2003/0018919 | A1* | 1/2003 | Arbab | G06F 21/41 726/5 |
| 2004/0153434 | A1* | 8/2004 | Cogen | G06Q 10/10 |
| 2005/0007236 | A1* | 1/2005 | Lane | G07F 7/122 340/5.86 |
| 2005/0188361 | A1* | 8/2005 | Cai | G06F 40/166 717/148 |
| 2006/0041830 | A1* | 2/2006 | Bohn | G06Q 10/00 715/202 |
| 2007/0016943 | A1* | 1/2007 | M'Raihi | H04L 9/3228 726/9 |
| 2007/0039039 | A1* | 2/2007 | Gilbert | H04L 63/0876 726/4 |
| 2007/0106748 | A1* | 5/2007 | Jakobsson | H04L 67/2842 709/217 |
| 2008/0028228 | A1* | 1/2008 | Mardikar | H04L 63/08 713/184 |
| 2008/0031447 | A1* | 2/2008 | Geshwind | H04L 9/3226 380/46 |
| 2010/0239093 | A1* | 9/2010 | Hotta | G06F 21/35 380/270 |
| 2010/0263029 | A1* | 10/2010 | Tohmo | H04L 9/3228 713/184 |
| 2011/0185407 | A1* | 7/2011 | Perrot | H04L 9/3273 726/6 |
| 2013/0283397 | A1* | 10/2013 | Griffin | H04W 4/50 726/28 |
| 2013/0331083 | A1* | 12/2013 | Oslund | H04W 48/06 455/419 |
| 2014/0057599 | A1* | 2/2014 | Hazari | H04W 12/0602 455/411 |
| 2014/0282993 | A1* | 9/2014 | Van Till | H04L 63/08 726/9 |
| 2015/0003607 | A1* | 1/2015 | Choi | H04W 12/003 380/44 |
| 2015/0288682 | A1* | 10/2015 | Bisroev | G16H 40/20 713/172 |
| 2015/0341334 | A1* | 11/2015 | Bhimanaik | G06F 21/41 726/4 |
| 2016/0092869 | A1* | 3/2016 | Salama | G06Q 20/322 705/41 |
| 2016/0094531 | A1* | 3/2016 | Unnikrishnan | H04L 63/08 726/7 |
| 2016/0127352 | A1* | 5/2016 | Xu | H04L 63/0815 726/8 |
| 2017/0090734 | A1* | 3/2017 | Fitzpatrick | G06F 40/137 |
| 2017/0118215 | A1* | 4/2017 | Varadarajan | H04L 67/02 |
| 2017/0346851 | A1* | 11/2017 | Drake | H04L 9/0838 |
| 2017/0359352 | A1* | 12/2017 | Ainscow | H04L 63/0884 |
| 2018/0004444 | A1* | 1/2018 | Murray | G06F 3/0629 |
| 2018/0046797 | A1* | 2/2018 | Mau | G06F 21/83 |
| 2018/0063118 | A1* | 3/2018 | England | H04W 12/08 |
| 2018/0189478 | A1* | 7/2018 | Richardson | G06F 21/50 |
| 2018/0225265 | A1* | 8/2018 | Fitzpatrick | G06F 16/951 |
| 2018/0270392 | A1* | 9/2018 | Araki | H04N 1/4413 |
| 2018/0288034 | A1* | 10/2018 | Edwards | G06Q 30/0277 |
| 2018/0295120 | A1* | 10/2018 | Dawson | H04L 9/3226 |
| 2018/0324172 | A1* | 11/2018 | Unnikrishnan | H04L 9/3213 |
| 2018/0367526 | A1* | 12/2018 | Huang | H04W 12/0609 |
| 2019/0220590 | A1* | 7/2019 | De Jonge | H04L 9/0872 |
| 2020/0059784 | A1* | 2/2020 | Batra | H04W 12/041 |
| 2020/0076732 | A1* | 3/2020 | Yang | H04L 12/4641 |
| 2020/0145409 | A1* | 5/2020 | Pochuev | H04L 63/166 |

OTHER PUBLICATIONS

Xiong, Yazhou. "Research on the Internet banking security based on dynamic password." In 2011 2nd International Conference on Artificial Intelligence, Management Science and Electronic Commerce (AIMSEC), pp. 4746-4749. IEEE, 2011. (Year: 2011).*

Gruteser, Marco, and Dirk Grunwald. "Enhancing location privacy in wireless LAN through disposable interface identifiers: a quantitative analysis." Mobile Networks and Applications 10, No. 3 (2005): 315-325. (Year: 2005).*

Zhang, Xiaoqi, Meina Song, and Junde Song. "A solution of electronic authentication services based on PKI for enabling e-business." In 2009 IEEE International Conference on e-Business Engineering, pp. 431-436. IEEE, 2009. (Year: 2009).*

Jakobsson, Markus, Jeff Hodges, Andy Steingruebl, Juan Caballero, Adam Barth, Dawn Song, Garth Bruen et al. "How things Work and Fail." The Death of the Internet (2012): 57-168. (Year: 2012).*

* cited by examiner

US 11,405,375 B2

DEVICE AND METHOD FOR RECEIVING A TEMPORARY CREDIT TOKEN

FIELD

Embodiments of the present disclosure generally relate to cybersecurity and more particularly to methods and systems to facilitate two-factor authentication processes.

BACKGROUND OF THE INVENTION

Cybersecurity is vital to ensuring protection of individuals' personal information. With on-line banking, shopping, investing, bill pay, and the like, sensitive individual information is now conveyed through the internet of things (IoT) often on a daily basis. Similarly, companies desire third party vendors and independent contractors to have access to company files and to be part of a company email network to ensure control and protect information provided to these outside parties, and to facilitate business.

As the exchange of information over the IoT increases, nefarious individuals attempting to steal individual and company information similarly has increased. Hackers utilize methods such as phishing, brute force, cross-site scripting, malware, and the like, to obtain personal and company information causing damage, embarrassment, and harm.

To combat these measures by hackers, increased security measures have been developed. These measures include requiring passwords of predetermined lengths and utilizing symbols and numbers, QR codes, security questions and the like to make hacking more difficult. Another method utilized to two-factor authentication. In two factor authentication processes, a user provides an initial secret to a network resource, such as a webpage, and this information is passed to an authentication service. The authentication service then generates and sends an authentication secret to the user to provide to the network resource. Often a secret code, such as a randomly generated six-digit code, is provided that expires after a pre-determined period of time. This secret code is then utilized to gain access to the network resource.

However, as the amount of network resources that require two-factor authentication increases, difficulties increase for a user. Specifically, between bank accounts, email accounts, work accounts, vendor accounts, financial accounts, shopping accounts, and the like, an individual can easily have five to ten or more account secrets that need to be utilized to access all of the different on-line resources. When each of these resources has a different policy and procedure for generating the initial secret, an individual can have numerous secrets that must be remembered and associated with the individual network resources.

Further, while auto population of information can combat, auto population of secrets poses its own security problems. Additionally, when a new device is utilized, remembering all of the secrets is extremely difficult, causing significant loss of time and mounting frustrations when attempting to access desired information. This can lead to changing of password and username procedures that are equally time consuming and frustrating.

SUMMARY

In accordance with an embodiment a device is provided including a processor and an input to collect credential related content including a first network resource identifier related to a first one of multiple network resources. The user content also includes a master password that is associated with the first network resource identifier and that is associated with network resource identifiers for a remainder of the multiple network resources. The device also includes a user interface, and a local storage medium to store program instructions accessible by the processor. Responsive to execution of the program instructions, the processor receives the user content including the master password and the first network resource identifier, and converts the master password and the first network resource identifier into a first hash code. In addition, the processer sends the first hash code to an authentication service to receive a temporary credential token from the authentication service in connection with the first hash code. The processor also sends the temporary credential token to the first one of multiple network resources, the temporary credential token to grant access to a user account on the first one of multiple network resources.

In accordance with another embodiment, a computer implemented method, is provided where under control of one or more processors programmed with specific executable instructions the method includes collecting credential related content including a first network resource identifier related to a first one of multiple network resources, the credential related content further including a master password that is associated with the first network resource identifier and that is associated with network resource identifiers for a remainder of the multiple network resources. The method also includes converting the master password and the first network resource identifier into a first secret code and sending the first secret code to a first authentication service.

In accordance with yet another embodiment, a computer program product is provided that includes a non-signal computer readable storage medium comprising computer executable code. The computer executable code collects credential related content including a first network resource identifier related to a first one of multiple network resources on a first computing device, the credential related content further including a master password that is associated with the first network resource identifier and that is associated with network resource identifiers for a remainder of the multiple network resources. The computer executable code also converts the master password and the first network resource identifier into a first secret code in the first computing device and sends the first secret code to a first authentication service.

DETAILED DESCRIPTION

Figure 1:
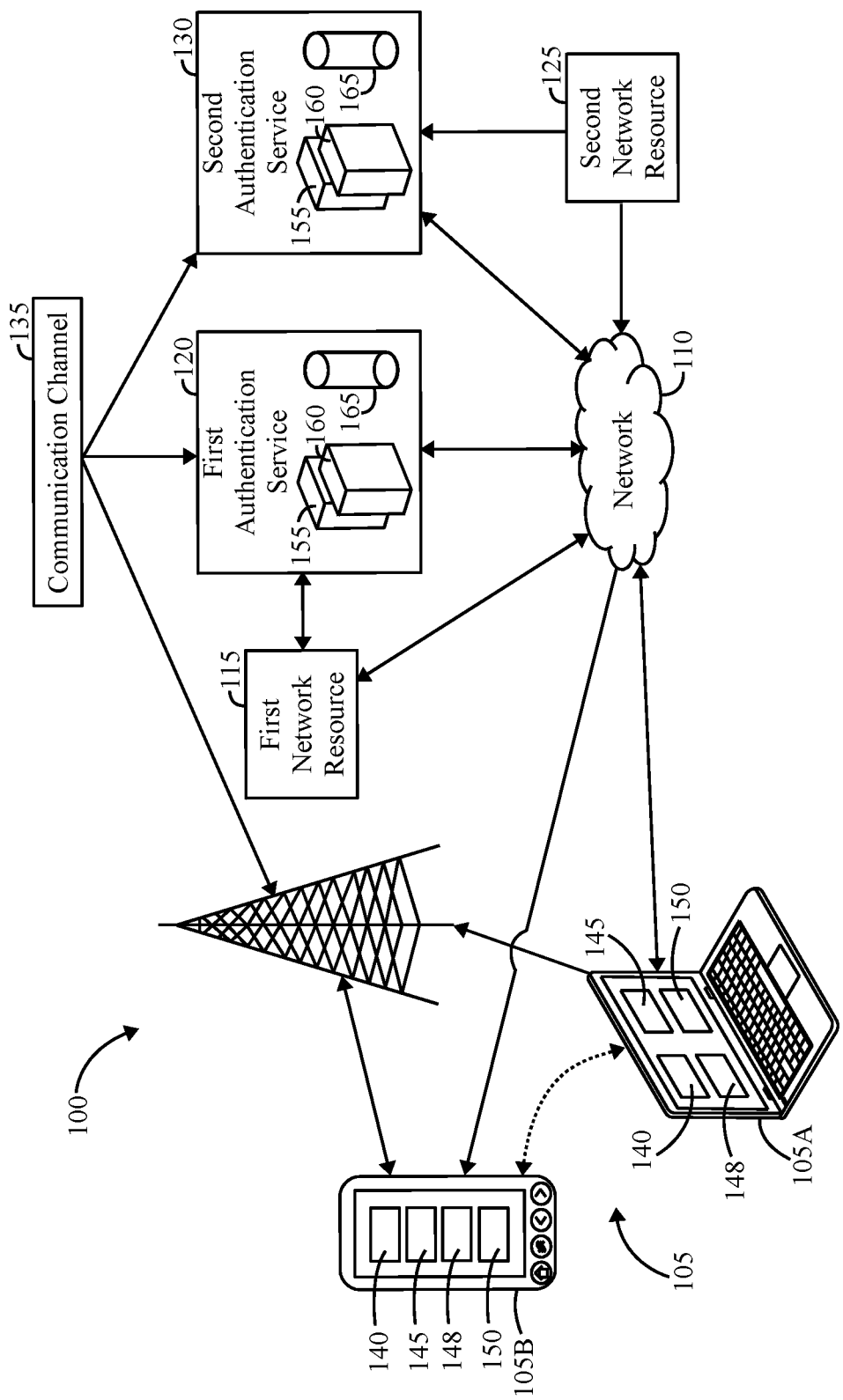
FIG. 1 schematic diagram of a system formed in accordance with an embodiment herein.

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "master password" as used throughout is used to refer to a string of characters, that can include numbers, letters, symbols, or the like used to gain access to information. This also includes codes, including QR codes, bar codes, fingerprint scans, eye scans, use of biometric markers, or the like. The information can include other passwords, third party network resource information, or the like.

A user application is provided for one or more computing devices of a user to create and reproduce secrets for multiple network resources utilizing two-factor authentication processes. The network resources include websites and applications that allow access to user bank accounts, shopping accounts, financial accounts, third party email and databases, or the like. Instead of an authentication service of the network resource, or host, generating a secret that is utilized to generate a second secret code or temporary credential token that is sent the user, the user application generates the secret and sends the secret to the authentication service of the network resource.

In particular, the application receives a master password and a plurality of network resource identifiers from the user. The network resource identifiers can be a website name, a number associated with a website, a letter associated with a website, or the like. The application then utilizes a one-way function, such as a one-way hash function, or algorithm, and associates the master password with each network resource identifier. The application then converts the master password and each individual network resource identifier into a separate secret code, that in one example is a hash code related to the particular network resource identifier that represents a secret for each network resource. The application then sends the required secret code, such as a hash code, to the authentication service of the network resource to receive a temporary token that the application sends to the network resource to gain access to the network resource.

In this manner, if a new or different computing device is utilized by the user, the user only needs to remember the master password and network resource identifier. The application will then utilize the identical one-way function to recreate the secret code to send to the authentication service to prevent the need to memorize numerous complex secrets or passwords. Additionally, because each secret is formed as a result of a one-way function, susceptibility to a brute force attack of a hacker is essentially eliminated.

FIG. 1 is a block diagram of a system 100 for providing user computing devices access to one or more network resources according to various embodiments described herein. The system 100 includes one or more computing devices 105 that are accessible to the user and communicate via the network 110 with at least a first network resource 115 with a first authentication service 120, and a second network resource 125 through a second authentication service 130.

By way of example, a computing device 105 may be a mobile device, such as a cellular telephone, smartphone, tablet, gaming systems, a streaming media hub device or other portable electronic terminal that is configured to access the network 110 over a wired or wireless connection. Optionally, the computing device 105 may represent a voice command device with functions including question answering, playing music and controlling smart devices. Additionally or alternatively, the computing device 105 may be a wired or wireless communication terminal, such as a desktop computer, laptop computer, network-ready television, set-top box, a cellular phone, tablet device, text messaging device, permanent home phone, a set-top box, a wearable device such as a smart watch or smart glasses, a home automation device, a network attached storage device, a gaming device, a streaming media hub device, a voice command device or any other communications device that is generally uniquely identifiable and uniquely associated with an individual user (such as through a telephone number, IP address or otherwise). The computing device 105 may access the network 110 using a web browser or a native application executing thereon. In some embodiments, the computing device 105 may have a physical size or form factor that enables it to be easily carried or transported by a user, or the computing device 105 may have a larger physical size or form factor than a mobile device.

The computing device 105 accesses network resources 115, 125 including web-based or network-based data, applications, and services, via the network 110. The network 110 may represent one or more of a local area network (LAN), a wide area network (WAN), an Intranet or other private network that may not be accessible by the general public, or a global network, such as the Internet or other publicly accessible network. The network 110 provides communication between the computing device 105, one or more authentication services 120, 130 and one or more network resources 115, 125 (such as web servers) that provide the aforementioned network data, applications, or services. The network resources 115, 125 may include a network transceiver, processor, memory, and/or other circuitry configured to coordinate and manage operations for delivering network resources to the computing devices 105.

In the exemplary embodiment of FIG. 1 the computing device 105 includes laptop computer 105A and a trusted user device 105B that communicates with the laptop computer. The user device 105B in the example of FIG. 1 represents a cellular telephone that communicates with a cellular network over one or more communications channels 135. The cellular network in turn communicates with the first and second authentication services 120 and 130 as explained herein. The communication between the user device 105B and the cellular network may be unidirectional or bidirectional. A communications channel 135 may be provided by any communications provider, such as any source that disseminates information. The network 110 and communications channel 135 may be physically/logically separate channels. Optionally, the network 110 and communications channel 135 may be separate channels over the same underlying network.

The computing device 105 may include a provisioning application 140, an authorization service 145, and data store 150 that operate to perform various functions described herein. In one example embodiment the provisioning application 140 is transferred to the computing device via hardware. Alternatively, the provisioning application 140 is downloaded from a remote resource as software. In either example, the provisioning application 140 is a computer program product including a non-signal computer readable storage medium comprising computer executable code to function as described herein.

In the exemplary embodiment of FIG. 1, each of the computing devices 105A and 105B may include the provisioning application 140, authorization service 145, code generator 148, and data store 150. Alternatively, only one computing device 105A or 105B includes the provisioning application 140, authorization service 145, code generator 148, and/or data store 150 and the other device receives the desired information from the other device.

In one example, the provisioning application 140 collects credential related content from an input from a user. In one embodiment the credential related content includes a master password and a plurality of network resource identifiers. The authorization service 145 verifies the credential related content, and the code generator 148 of the provisioning application 140 generates and sends a secret code to obtain a pairing code from an authentication service 120 or 130. In one example the code generator 148 utilizes a one-way function, and in one embodiment a hash function, based on the master password and a first network resource identifier that is related to the first network resource to generate a first hash code, while the master password and a second network resource identifier that is related to the second network resource generates a second hash code. In one such example, the network resource identifiers are based on website name and the functions are presented as follows:

Hash(masterpassword+WebSiteAName)=WebSiteA Secret
Hash(masterpassword+WebSiteBName)=WebSiteB Secret
Hash(masterpassword+WebSiteCName=WebSiteC Secret In another example the network resource identifiers are based on a counter where each counter is associated with a website and the functions are presented as follows:

Hash(masterpassword+1)=WebSiteA Secret
Hash(masterpassword+2)=WebSiteB Secret
Hash(masterpassword+3)=WebSiteC Secret In yet another example the network resource identifiers are based on an alphabet-based counter is associated with a website and the functions are presented as follows:

Hash(masterpassword+A)=WebSiteA Secret
Hash(masterpassword+B)=WebSiteB Secret
Hash(masterpassword+C)=WebSiteC Secret Alternatively, the value of the network resource identifier could be unknown to the user. Instead, a network resource 115 or 125 can maintain the network resource identifier. In such an example, all such network resource identifiers could be the same for all users. Alternatively, such network resource identifier can be different for each individual user, but based on user information such as username, time account was created, and the like. The network resource identifier can then be sent form a network resource 115 or 125 to the provisioning application 140. In this manner managers of the network resources 115 or 125 may determine if they desire to take part in the selection of the secret code, or if this code should be solely generated by the provisioning application 140.

In each instance, a single master password is used in association with a network resource identifier that is simple to remember, such as the name of a website or a number or letter associated with that website. Because a one-way function, such as a hash function, is utilized the website secret is as also long and complex as the hash function, such as a 256-bit hash function. This virtually eliminates any chance of a hacker utilizing a brute force technique to obtain the hash code.

Based on the hash code, the first authentication service 120 or second authentication service 130 receives the hash code at a provisioning service 155. After the authorization service 160 verifies the hash code, a pairing code is sent to the provisioning application 140 of the computing device 105 and to the first network resource 115 via the network 110 and/or the communication channel 135. Specifically, each of the first and second authentication services 120 and 130 includes a provisioning service 155, an authorization service 160, and a data store 165, the operations which are described herein. The authentication services 120 and 130 consequently each send a pairing code that is credential related content such as a temporary credential token, based on the secret hash code received from the provisioning application 140 related to the master password. The temporary credential token is associated with the user of the computing device 105 to provide to the generating authentication service 120 or 130 to access the corresponding network resource 115 or 125.

While illustrated as single entities in FIG. 1, it will be understood that, in some embodiments, the network resources 115, 125 may represent one or more physical or virtual servers that are configured to deliver network resources to the computing devices 105. Examples of the network resources 115, 125 include, but are not limited to, web-based or network-based data storage services, social networking applications, shopping services, microblogging accounts, payment services, multimedia content delivery services (for delivery of online magazines, music, video, etc.) and financial services (such as credit/banking services). The resources 115, 125 may represent a Web service or a network service for an e-commerce business, financial institution, or any other commercial, noncommercial, personal, nonprofit or other entity.

Figure 2:
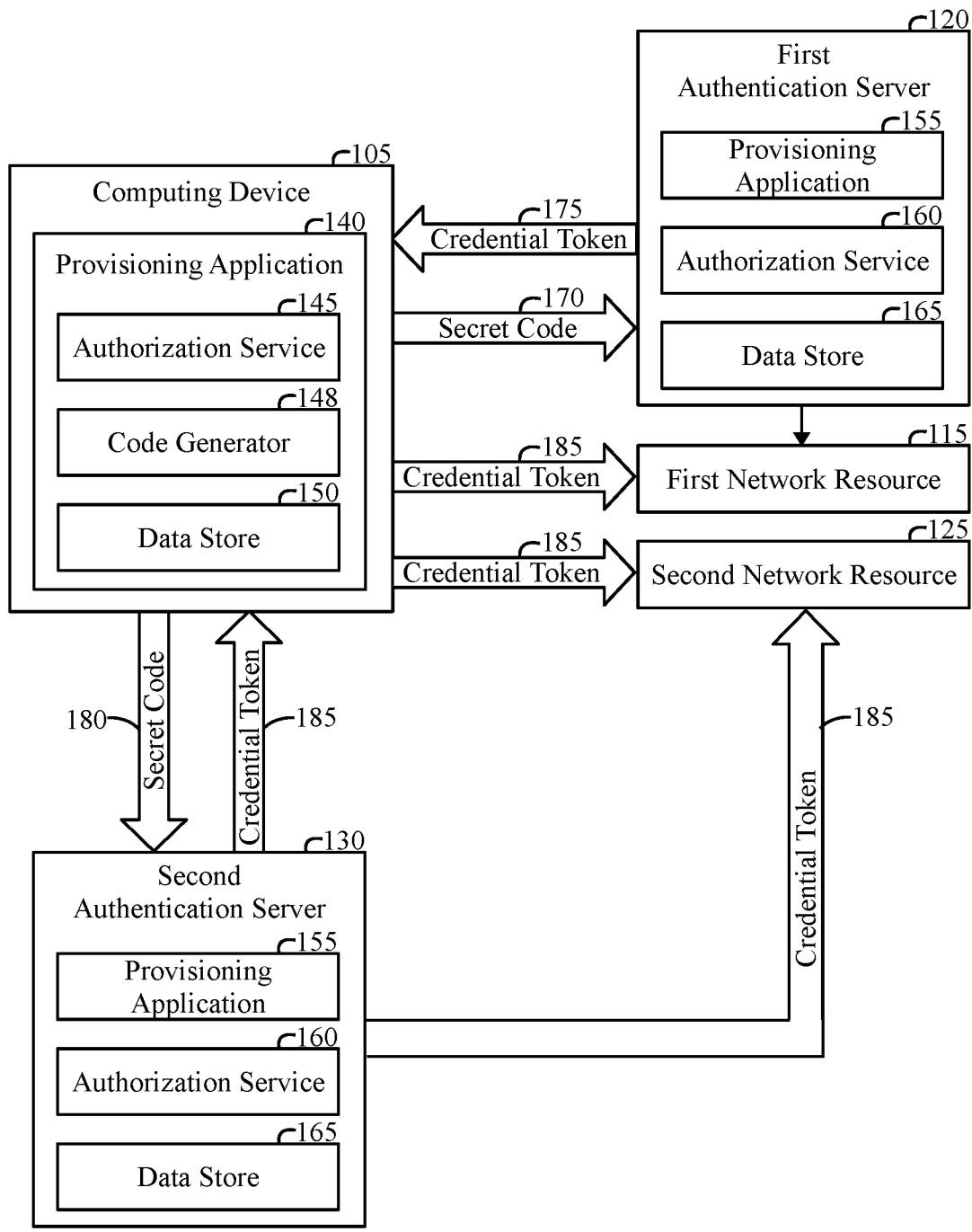
FIG. 2 illustrates a schematic diagram of information flow for a system formed in accordance with an embodiment herein.

FIG. 2 illustrates a functional diagram of portions of the system 100 of FIG. 1 as well as certain data, information and content conveyed there between. In FIG. 2, the computing device 105 through the provisioning application 140 is implemented as described herein to communicate with the first authentication service 120 and second authentication service 130. The first authentication service 120 communicates with provisioning application 140 of the computing device 105, and first network resource 115; while the second authentication service 130 communicates with the provisioning application 140 of the computing device 105, and the second network resource 125. In one example, the first network resource 115 is an account database at a credit union while the second network resource is a remote email server of a customer. Specifically, the provisioning application 140 of the computing device 105 may communicate with unrelated network resources that do not communicate with one another.

Thus, in an example embodiment, when a user inputs a master password and a first network resource identifier the code generator 148 of the provisioning application 140 utilizes a one-way function, such as a hash function, to convert the master password and first network resource identifier into a first secret code 170 that is sent to the first authentication service 120. In one example the first secret code 170 is a first hash code. The first authentication service 120 upon receiving the first secret code 170 verifies the first secret code 170 at an authorization service 160 and sends a first credential token 175 to the computing device 105. In one example the first credential token 175 is a six-digit number that is transmitted to the computing device 105, a token possessed by the user, an email account of the user, in a text message, or the like such that the user has a predetermined amount of time, such as one minute, to enter or provide the first credential token 175. The first credential token 175 is also provided, or sent, to the first network resource 115 by the first authentication service 120, such that when the first credential token 175 is sent from the computing device 105 to the first network resource 115, the first credential token 175 is matched, or paired, to allow access to the data within the first network resource 115. Such data includes bank account information, emails, shopping cart information, and the like.

Similarly, when the user inputs a master password and a second network resource identifier the code generator 148 of the provisioning application 140 utilizes the one-way function to convert the master password and second network resource identifier into a second secret code 180 that is sent to the second authentication service 130. In one example the second secret code 180 is a second hash code. The second authentication service 130 upon receiving the second secret code 180 verifies the second secret code 180 at an authorization service 160 and sends a second credential token 185 to the computing device 105. In one example, the second credential token 185 is a six-digit number that is transmitted to the computing device 105, a token possessed by the user, an email account of the user, in a text message, or the like such that the user has a predetermined amount of time, such as one minute, to enter or provide the second credential token 185. The second credential token 185 is also provided, or sent, to the second network resource 125 by the second authentication service 130, such that when the second credential token 185 is sent from the computing device 105 to the second network resource 125, the second credential token 185 is matched, or paired to allow access to the data within the second network resource 125. Such data includes bank account information, emails, shopping cart information, and the like.

Although FIGS. 1 and 2 illustrate an example in accordance with some embodiments, it will be understood that the present disclosure is not limited to such a configuration but is intended to encompass any configuration capable of carrying out the operations described herein. For example, although primarily discussed above with reference to first authentication service 120 that is separate from the first network resource 115 and a second authentication service 130 that is separate from the second network resource 125, the first authentication service 120 and first network resource 115 may be controlled by the same third party, while the second authentication service 130 and second network resource 125 are also controlled by another similar third party. More generally, various functionality described herein with reference to separate functional elements may be combined within a single functional element and, vice versa, functionality described herein in single functional elements can be carried out by a plurality of separate functional elements.

Figure 3:
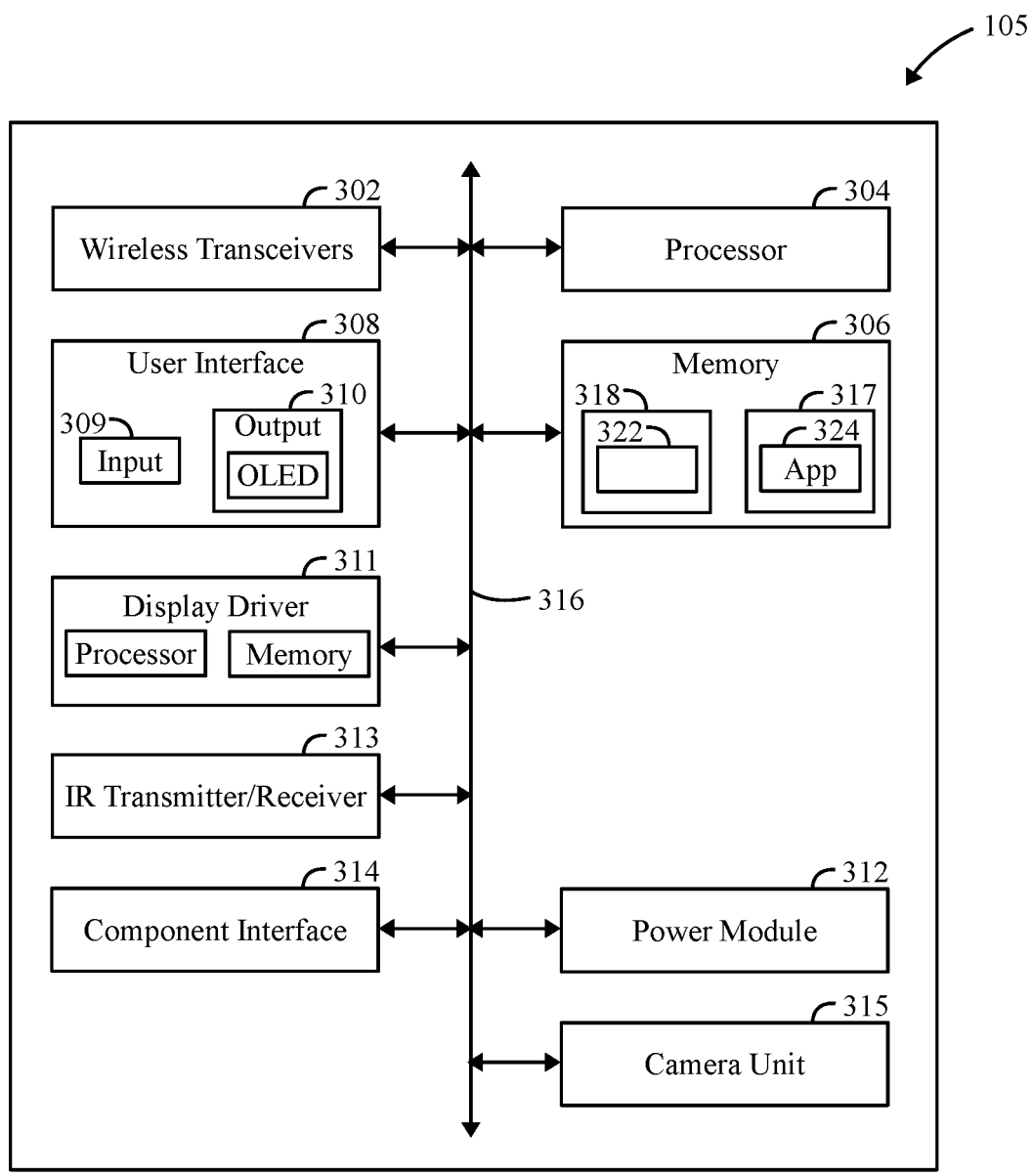
FIG. 3 illustrates a simplified block diagram of an illustrative computing device in accordance with embodiments herein.

FIG. 3 illustrates a simplified block diagram of the computing device 105, which includes components such as one or more wireless transceivers 302, one or more processors 304 (e.g., a microprocessor, microcomputer, application-specific integrated circuit, etc.), one or more local storage medium (also referred to as a memory portion) 306, a user interface 308 which includes one or more input devices 309 and one or more output devices 310, a display driver 311, a power module 312, a transmitter/receiver 313, a component interface 314, and a camera unit 315. All of these components can be operatively coupled to one another, and can be in communication with one another, by way of one or more internal communication links 316, such as an internal bus.

The input and output devices 309, 310 may each include a variety of visual, audio, and/or mechanical devices. For example, the input devices 309 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 310 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 310 may include a touch sensitive screen, a non-touch sensitive screen, a text-only display, a smart phone display, an audio output (e.g., a speaker or headphone jack), and/or any combination thereof.

The user interface 308 permits the user to select one or more of a switch, button or icon to collect content elements, and/or enter indicators. As one example, the one or more processors 304 may select a photo/video/memo capture soft button directing the computing device 105 to take a picture, or record video/audio. As another example, the user may select a content collection button (photo/video/memo capture soft button) on the user interface two or more successive times, thereby instructing the computing device 105 to capture the content element.

The local storage medium 306 can encompass one or more memory devices of any of a variety of forms (e.g., read only memory, random access memory, static random access memory, dynamic random access memory, etc.) and can be used by the processor 304 to store and retrieve data. The data that is stored by the local storage medium 306 can include, but need not be limited to, operating systems, applications, user collected content and informational data. Each operating system includes executable code that controls basic functions of the communication device, such as interaction among the various components, communication with external devices via the wireless transceivers 302 and/or the component interface 314, and storage and retrieval of applications and data to and from the local storage medium 306. In one example the provisioning application 140 of the computing device 105 is an application retrieved from the local storage medium 306. Each such application includes executable code, such as a hash function, that utilizes an operating system to provide more specific functionality for the communication devices, such as file system service and handling of protected and unprotected data stored in the local storage medium 306.

The terms "content" and "user collected content", as used throughout, shall generally refer to a collection of one or more calls, contacts, calendar, notes, and task information, text messages, email messages, and picture, audio, and video media files. The terms "content element" and "user collected content element", as used throughout, shall generally refer to an individual call, contact, calendar event, note, task, text message, email message, picture, audio recording and/or video recording.

As explained herein, the local storage medium 306 stores content 317 that includes temporary content elements 318, such as a master password of the exemplary embodiments of FIGS. 1-2, saved in common or separate memory sections. The temporary content elements 318 have identifiers 322, such as the network resource identifiers of exemplary embodiments of FIGS. 1-2, stored in connection therewith. As explained herein, the identifiers 322 designate at least a portion of the content 317 to represent temporary content elements 318. The identifiers may include or exclude lifetime markers designating when (or under what circumstances) the associated temporary content element 318 is to be deleted from the local storage medium 306. For example, the lifetime markers may be location-based, time-based or otherwise.

Additionally, the applications stored in the local storage medium 306 include a transient content management (TCM) application 324 for facilitating the management of content, identifiers, and operation of the computing device 105 in order to allow a user to read, create, edit, delete, organize or otherwise manage the content or to configure mobile device settings. The TCM application 324 is preferably activated by default upon start-up of the computing device 105, and can be activated or disabled via input devices 309 of the user interface 308. In one embodiment, the TCM application 324 may be activated when the computing device 105 is placed in a predetermined mode. The TCM application 324 includes program instructions accessible by the one or more processors 304 to direct a processor 304 to implement the methods, processes and operations described herein including, but not limited to the methods, processes and operations illustrated in the Figures and described in connection with the Figures.

Other applications stored in the local storage medium 306 include various application program interfaces (APIs), some of which provide links to/from a cloud hosting service. The power module 312 preferably includes a power supply, such as a battery, for providing power to the other components while enabling the computing device 105 to be portable, as well as circuitry providing for the battery to be recharged. The component interface 314 provides a direct connection to other devices, auxiliary components, or accessories for additional or enhanced functionality, and in particular, can include a USB port for linking to a user device with a USB cable.

Each transceiver 302 can utilize a known wireless technology for communication. Exemplary operation of the wireless transceivers 302 in conjunction with other components of the computing device 105 may take a variety of forms and may include, for example, operation in which, upon reception of wireless signals, the components of computing device 105 detect communication signals and the transceiver 302 demodulates the communication signals to recover incoming information, such as voice and/or data, transmitted by the wireless signals. After receiving the incoming information from the transceiver 302, the processor 304 formats the incoming information for the one or more output devices 310. Likewise, for transmission of wireless signals, the processor 304 formats outgoing information, which may or may not be activated by the input devices 310, and conveys the outgoing information to one or more of the wireless transceivers 302 for modulation to communication signals. The wireless transceiver(s) 302 convey the modulated signals to a remote device, such as a cell tower or a remote server (FIG. 1).

Specific reference will now be made here below to FIGS. 4-5. It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Figure 4:
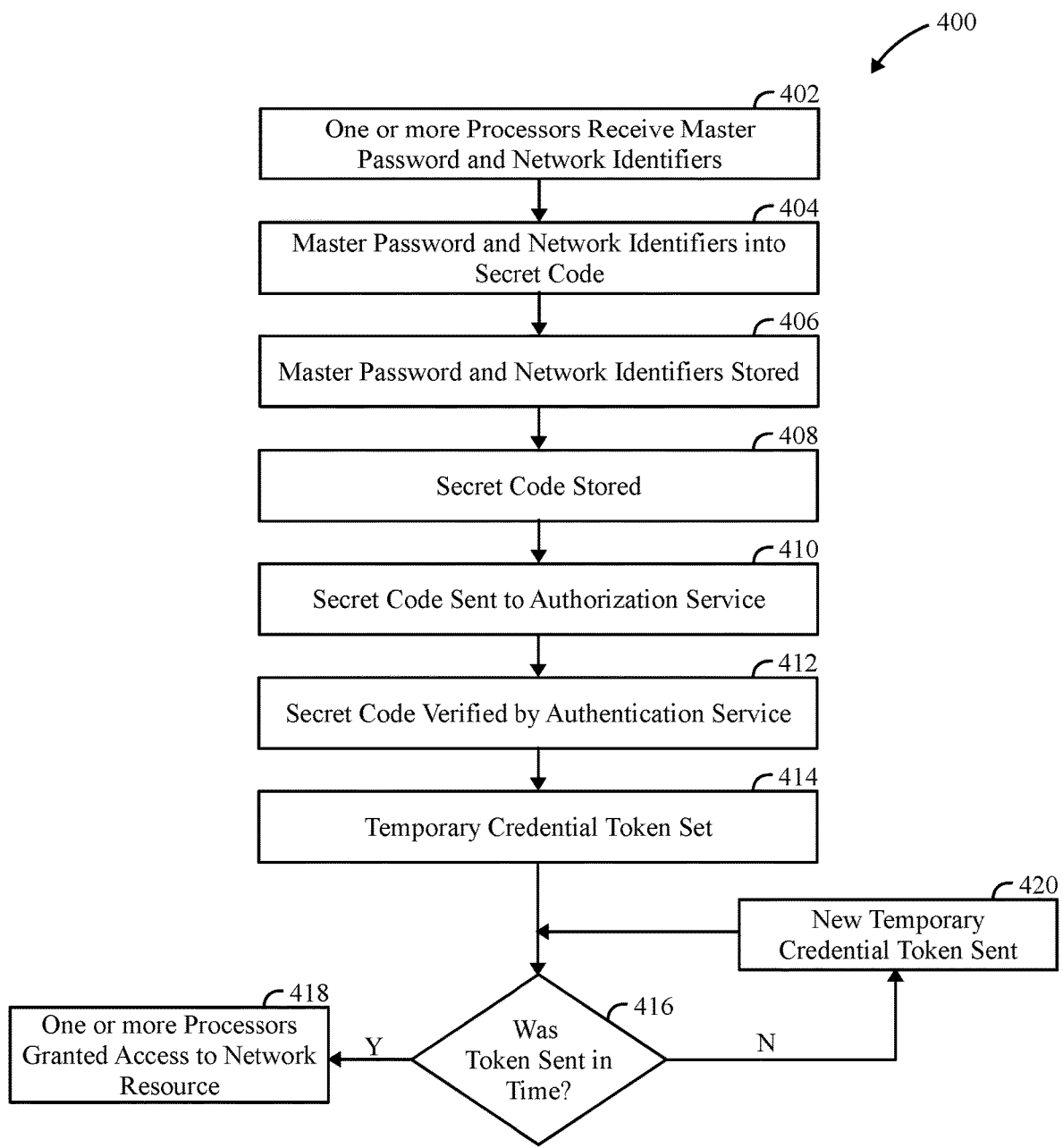
FIG. 4 illustrates a process for providing user computing devices access to one or more network resources in accordance with embodiments herein.

FIG. 4 illustrates a process carried out by one or more systems 400 for providing user computing devices access to one or more network resources according to various embodiments described herein, including the example system of FIG. 1, functional diagram of FIG. 2, and computing device 105 of FIG. 3. The operations of FIG. 4 are carried out by one or more processors executing program instructions stored in memory. The operations of FIG. 4 may be distributed between the processors within one or more systems, and may be carried out in various orders.

At 402, one or more processors receive a master password and a plurality of network resource identifiers. Each network resource identifier is related to a different network resource such as a webpage or website. In one example, each of the plurality of network resource identifiers is the name of a website. In another example, each of the plurality of network resource identifiers is a number. In yet another example, each of the plurality of network resources is a letter.

At 404, one or more processors convert the master password and each of the plurality of network resource identifiers into a secret code with a code generator 148. In one example the secret code is a hash code. Therefore, the master password and a first network resource identifier are converted into a first secret code 170, the master password and a second network resource identifier are converted into a second secret code 180, the master password and a third network resource identifier are converted into a third secret code, and the master password and the nth network resource identifier are converted into an nth secret code.

At 406, one or more processors store the master password and plurality of network resource identifiers in a data store 150 of the provisioning application 140. At 408, one or more processors send a selected secret code to a corresponding authentication service 120 or 130. Thus, in one example the first secret code is sent to the first authentication service 120. Alternatively, the second secret code is sent to the second authentication service 130, the third secret code is sent to a third authentication service, or an nth secret code is sent to an nth authentication service.

At 408, the one or more processors store the selected secret code in data storage 150. At 410, one or more processors send the selected secret code with the provisioning application 140 to the related authentication service 120, 130. At 412, the selected authentication service verifies the secret code and sends the one or more processors a temporary credential token. At 414, one or more processors send the selected authentication service the temporary credential token from the provisioning application 140 related to the network resource. The temporary credential token in one example is a six (6) digit number that lasts a predetermined period of time, such as one minute. At 416, one or more processors determine whether the temporary credential token has been entered during the predetermined period. If yes, at 418, the one or more processors are granted access to the content at the selected network resource 115 or 125, such as account content or information. If no, and the temporary credential token is not entered during the predetermined period of time, at 420 a new temporary credential token and predetermined period of time are provided by the authentication service 120 or 130 to the provisioning application 140.

Figure 5:
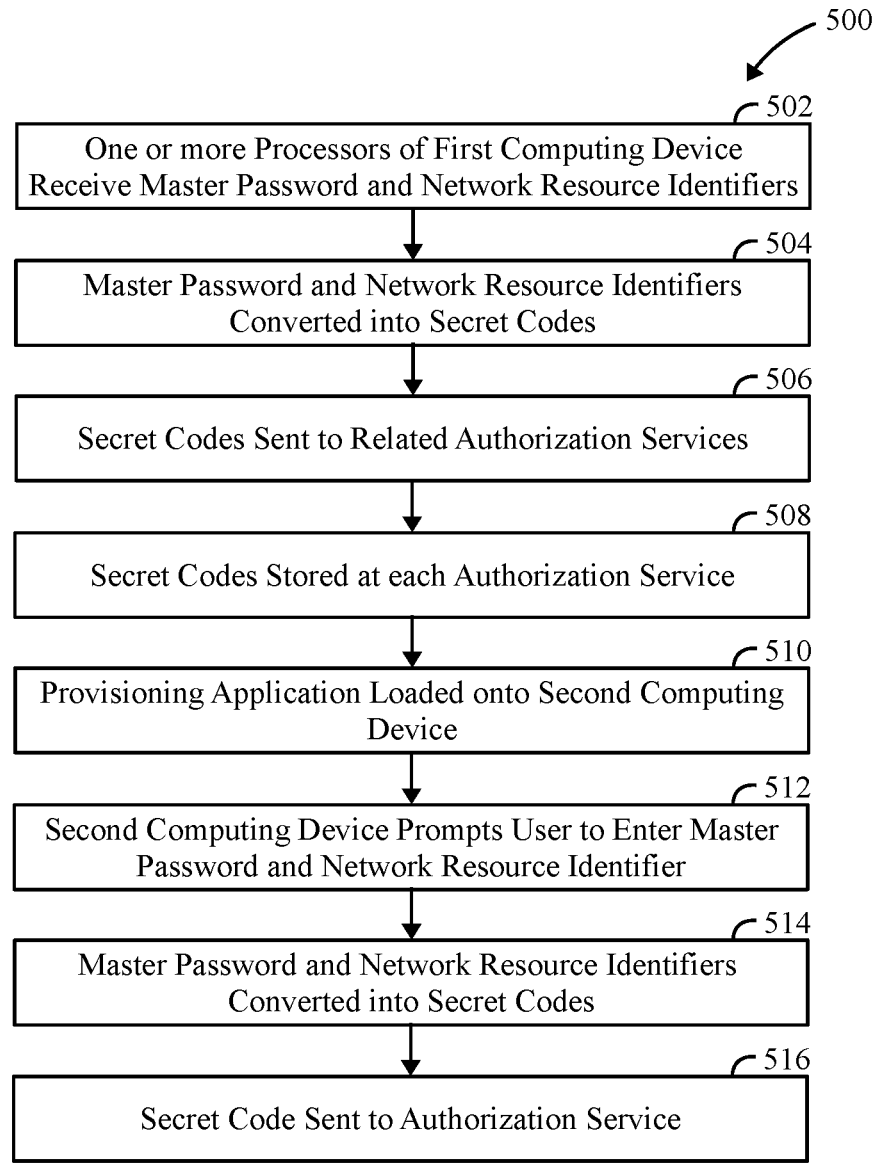
FIG. 5 illustrates a process for providing user computing devices access to one or more network resources in accordance with an embodiment herein.

FIG. 5 illustrates a process 500 carried out by one or more systems 100 for providing user new computing devices access to one or more network resources according to various embodiments described herein, including the example system of FIG. 1 and functional diagram of FIG. 2. In one example, both an initial computing device and a new computing device are a computing device 105 of FIGS. 1-2 and described in FIG. 3.

At 502, one or more processors of an initial, or first computing device receive a master password and a plurality of network resource identifiers. Each network resource identifier is related to a different network resource such as a webpage or website. In one example, each of the plurality of network resource identifiers is the name of a website. In another example, each of the plurality of network resource identifiers is a number. In yet another example, each of the plurality of network resources is a letter.

At 504, one or more processors convert the master password and each of the plurality of network resources into a secret code with a code generator 148. In one example, the secret code is a hash code. Therefore, the master password and a first network resource identifier are converted into a first secret code 170, the master password and a second network resource identifier are converted into a second secret code 180, the master password and a third network resource identifier are converted into a third secret code, and the master password and the nth network resource identifier are converted into an nth secret code.

At 506, one or more processors send each of the secret codes to authentication services related to the secret codes. At 508, each authentication service stores the generated secret code in a data store 165.

At 510, the provisioning application 140 is loaded onto a new, or second computing device. The provisioning application 140 still has the identical one-way function, that in one example is a hash function, as was on the initial computer. At 512, one or more processors of the second computing device prompts the user to enter the master password and each network resource identifier. At 514, one or more processors of the new computing device covert the master password and each of the plurality of network resources into the identical secret code as generated in the initial computing device with a code generator 148. Therefore, in an example embodiment the master password and a first network resource identifier are converted into the first secret code 170, the master password and a second network resource identifier are converted into the second secret code 180, the master password and a third network resource identifier are converted into the third secret code, and the master password and the nth network resource identifier are converted into the nth secret code. At 516, one or more processors of the new computing device send a preselected secret code to the related authentication service 120, 130. In this manner each of the passwords from the initial computing device are recreated without having to contact the network resource or following lost password procedures.

Thus, in the event of data loss of a computing device 105, damage to the device 105, porting to a new device 105, or the like, the provisioning application 140 can recreate all secret codes to all network resources 115, 125. This is done without having to contact go through steps of communicating with the network resources 115, 125 to provide fast and safe secret code retrieval.

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A device, comprising: a processor;
an input device to collect credential related content including a first network resource identifier related to a first one of multiple network resources, the credential related content further including a master password that is associated with the first network resource identifier and that is associated with network resource identifiers for a remainder of the multiple network resources, wherein the first one of multiple network resources is selected from the group consisting of bank website, shopping website, email network, and financial institution website;
a local storage medium to store program instructions accessible by the processor;
wherein, responsive to execution of the program instructions, the processor to:
receive the credential related content including the master password and the first network resource identifier;
convert, with a code generator of a provisioning application, the master password and the first network resource identifier into a first secret code utilizing a one-way function; and
send the first secret code to an authentication service;
receive a first temporary credential token from the authentication service in connection with the first secret code;
send the first temporary credential token to the first one of multiple network resources, the temporary credential token to grant access to a user account on the first one of multiple network resources;
gain access to information at the first network resource based on the first temporary credential token;
receive a second network resource identifier related to a second one of the multiple network resources;
repeat the convert, receive, send, and gain operations in connection with the second network resource identifier of the multiple network resources utilizing the master password and the second network resource identifier.

2. The device of claim 1, wherein the first network resource identifier is selected from the group consisting of website name, counter, and letter.

3. The device of claim 1, wherein a hash function converts the master password and first network resource identifier into the secret code.

4. The device of claim 1, wherein, responsive to execution of the program instructions, the processor to:
receive a user request to send the secret code to the first authentication service;
prompt a request for the master password and the first network resource identifier; and
send the secret code to the first authentication service.

5. The device of claim 1, wherein, the device is a mobile device.

6. The device of claim 1, wherein the first network resource includes a first password and the second network resource includes a second password, and the first password is different than the second password.

7. A computer implemented method, comprising:
under control of one or more processors programmed with specific executable instructions,
collecting credential related content including a first network resource identifier related to a first one of multiple network resources,
the credential related content further including a master password that is associated with the first network resource identifier and that is associated with network resource identifiers for a remainder of the multiple network resources, wherein the first one of multiple network resources is selected from the group consisting of bank website, shopping website, email network, and financial institution website;
receiving the credential related content including the master password and the first network resource identifier;
converting, with a code generator of a provisioning application, the master password and the first network resource identifier into a first secret code utilizing a one-way function;
sending the first secret code to a first authentication service;
receiving a first temporary credential token from the authentication service in connection with the first secret code;
sending the first temporary credential token to the first one of multiple network resources, the temporary credential token to grant access to a user account on the first one of multiple network resources;
gaining access to information at the first network resource based on the first secret code temporary credential token;
receiving a second network resource identifier related to a second one of the multiple network resources;
repeating the convert, receive, send, and gain operations in connection with the second network resource identifier of the multiple network resources utilizing the master password and the second network resource identifier.

8. The computer implemented method of claim 7, further comprising:
receiving a temporary credential token from the first authentication service in connection with the first secret code; and
sending the temporary credential token to the first network resource, the temporary credential token to grant access to information on the first network resource.

9. The computer implemented method of claim 8, further comprising:
repeating the receiving and sending operations associated with the temporary credential token in connection with the second one of the multiple network resources utilizing the master password.

10. The computer implemented method of claim 7, wherein the first secret code is a first hash code, and the second secret code is a second hash code.

11. The computer implemented method of claim 7, wherein the first network resource identifier is selected from the group consisting of website name, counter, and letter.

12. The computer implemented method of claim 7, further comprising:
receiving a user request to send the first secret code to the first authentication service;
prompting a request for the master password and the first network resource identifier; and
reconverting the master password and the first network resource identifier into the first secret code.

13. The computer implemented method of claim 7, further comprising:
resending the first secret code to the first authentication service.

14. A computer program product comprising a non-signal computer readable storage medium comprising computer executable code to:
collect credential related content including a first network resource identifier related to a first one of multiple network resources on a first computing device,
the credential related content further including a master password that is associated with the first network resource identifier and that is associated with network resource identifiers for a remainder of the multiple network resources, wherein the first one of multiple network resources is selected from the group consisting of bank website, shopping website, email network, and financial institution website;
receive the credential related content including the master password and the first network resource identifier;
convert, with a code generator of a provisioning application, the master password and the first network resource identifier into a first secret code utilizing a one-way function in the first computing device;
send the first secret code to a first authentication service;
receive a first temporary credential token from the authentication service in connection with the first secret code;
send the first temporary credential token to the first one of multiple network resources, the temporary credential token to grant access to a user account on the first one of multiple network resources;
gain access to information at the first network resource based on the first temporary credential token;
receive a second network resource identifier related to a second one of the multiple network resources;
repeat the convert, receive, send, and gain operations in connection with the second network resource identifier of the multiple network resources utilizing the master password and the second network resource identifier.

15. The computer program product of claim 14, the computer executable code to:
collect credential related content including the first network resource identifier related to the first one of multiple network resources on a second computing device, the credential related content further including the master password that is associated with the first network resource identifier and that is associated with network resource identifiers for a remainder of the multiple network resources;

convert the master password and the first network resource identifier into the first secret code in the second computing device; and send the first secret code to a first authentication service.

16. The computer program product of claim 14, wherein the first computing device is a mobile device.

17. The computer program product of claim 14, wherein the master password is selected from the group consisting of user name and password, QR code, and symbol.

18. The computer program product of claim 14, wherein a hash function converts the master password and the first network resource identifier into the first secret code.

* * * * *